May 12, 1970            A. SCHONFELD            3,511,495
DOCUMENT FEEDER MECHANISM
Filed Jan. 24, 1968                         2 Sheets-Sheet 2
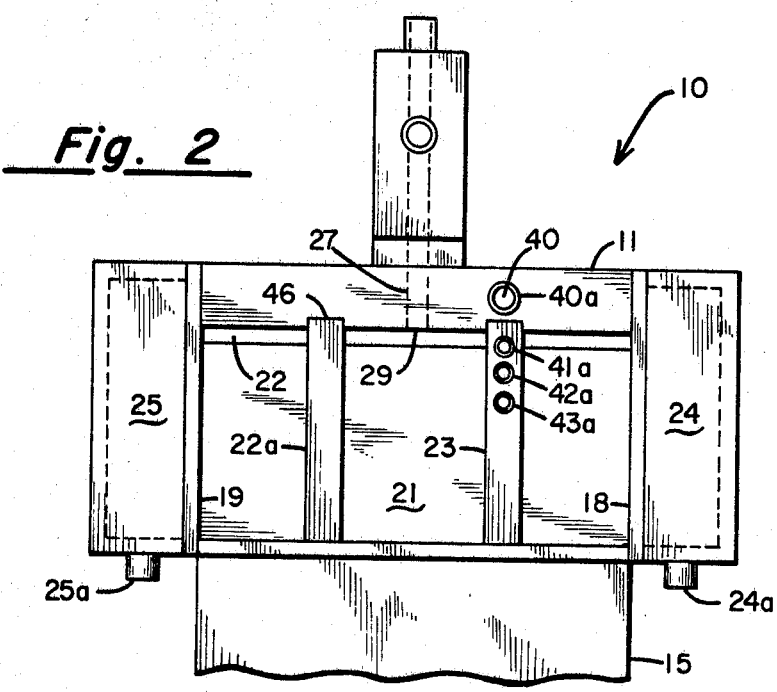
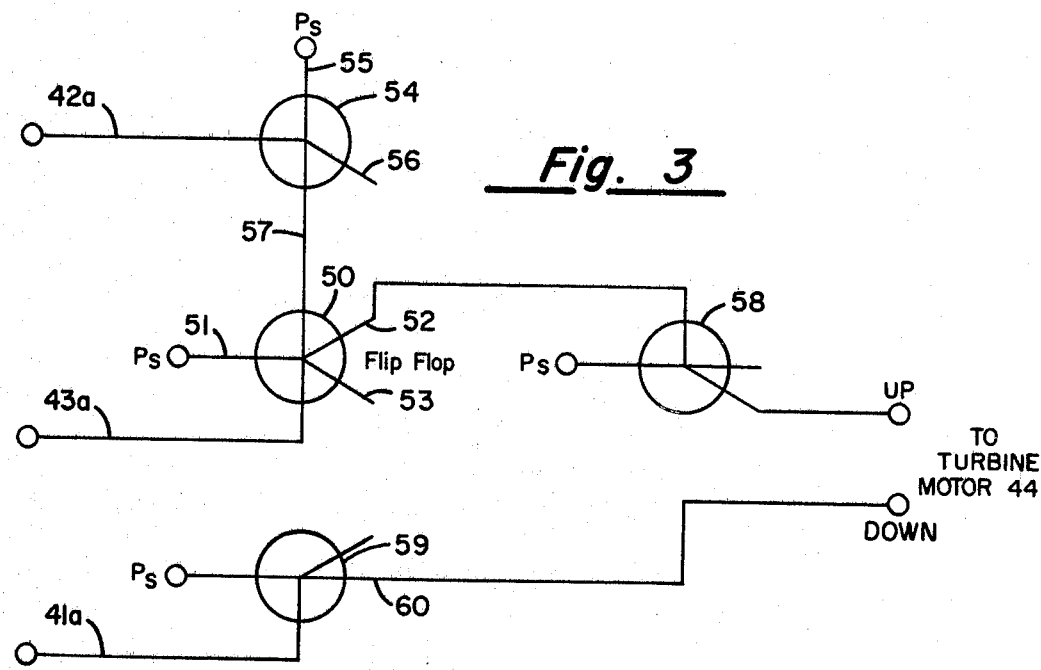

United States Patent Office 3,511,495
Patented May 12, 1970

3,511,495
DOCUMENT FEEDER MECHANISM
Arnold Schonfeld, Norristown, Pa., assignor to Sperry Rand Corporation, New York, N.Y., a corporation of Delaware
Filed Jan. 24, 1968, Ser. No. 700,083
Int. Cl. B65h 3/08
U.S. Cl. 271—26                                  7 Claims

ABSTRACT OF THE DISCLOSURE

A document feeder mechanism is disclosed which includes a document separator chamber disposed at the top of a document magazine or hopper. The separator chamber, which may be a boxlike structure, includes a throat portion formed at one end thereof from which documents are discharged. Air forced into the chamber through a plurality of openings formed in the side walls of the chamber fluffs the documents in the chamber and causes them to separate from one another to thereby facilitate their being fed from the chamber. A fluid jet means is trained on the topmost document in the separator chamber and operates when energized to quickly propel the topmost document into the throat portion of the chamber where it may be engaged by a high speed document transport mechanism.

This invention relates in general to a document feeder mechanism and in more particular to a novel pneumatically controlled feeder mechanism.

Document feeder mechanisms which utilize gripping rolls, picker knives, endless belts, etc. are expensive to fabricate, must be frequently maintained and often damage the document itself due to the mechanical nature of the document feeding action.

In contrast the present invention manipulates the documents through the use of air jets and thereby avoids wear or damage to the documents. Furthermore, the present invention has a minimum of moving parts and it is therefore inexpensive to build, requires little or no service attention and is not subject to wear. A further feature of the present invention is that the documents are pneumatically separated from one another at the feeder station and are continuously held in a position to be quickly and reliably fed one at a time into a document transport system.

BRIEF SUMMARY OF THE INVENTION

The document feeder of the present invention comprises a document separator chamber located at the top of a document hopper or magazine. Documents in the hopper or magazine are carried into the bottom of the separator chamber from the hopper or magazine on an elevator platform. The separator chamber is a box-like structure which has air entering the sides of the chamber under pressure. The air so supplied acts to fluff the documents and to cause their separation from one another. One end of the chamber contains a sloping wall section which has a large almost unrestricted vent area to atmosphere while the other end of the separator chamber has only a small restrictive throat portion therein. As a result most of the air entering the side walls of the chamber exhausts out the one end of the chamber. This imbalanced exhaust forces the documents up against the sloping end wall section of the chamber and if a pair of documents are stuck together one of the documents will strike the sloping wall section before the other document and the two will shear apart. This action thus further insures that the documents are separated from one another.

A fluid feeder jet means positioned in the top of the separator chamber is angularly trained toward the throat portion of the chamber. The feeder jet means is selectively energized and operates to apply a force to the upper surface of the topmost document in the separator chamber thereby feeding this document into the throat portion of the chamber where the document is engaged typically by a high speed pneumatically controlled transport system. Since the feeder jet operates only on the upper surface of the topmost document, and all other documents in the chamber are driven to the rear of the chamber by the action of the air entering the sides of the chamber a further separation action occurs at this time.

A set of fluid jets located near the first-mentioned end of the chamber act to sense the document level in the chamber and to control the magazine elevator platform to maintain the desired document level in the chamber.

In reference to the drawings:

FIG. 2 is an end view of FIG. 1 as viewed from the left, and

FIG. 3 is a schematic diagram showing a typical control network for the document elevator shown in FIG. 1.

Figure 1:
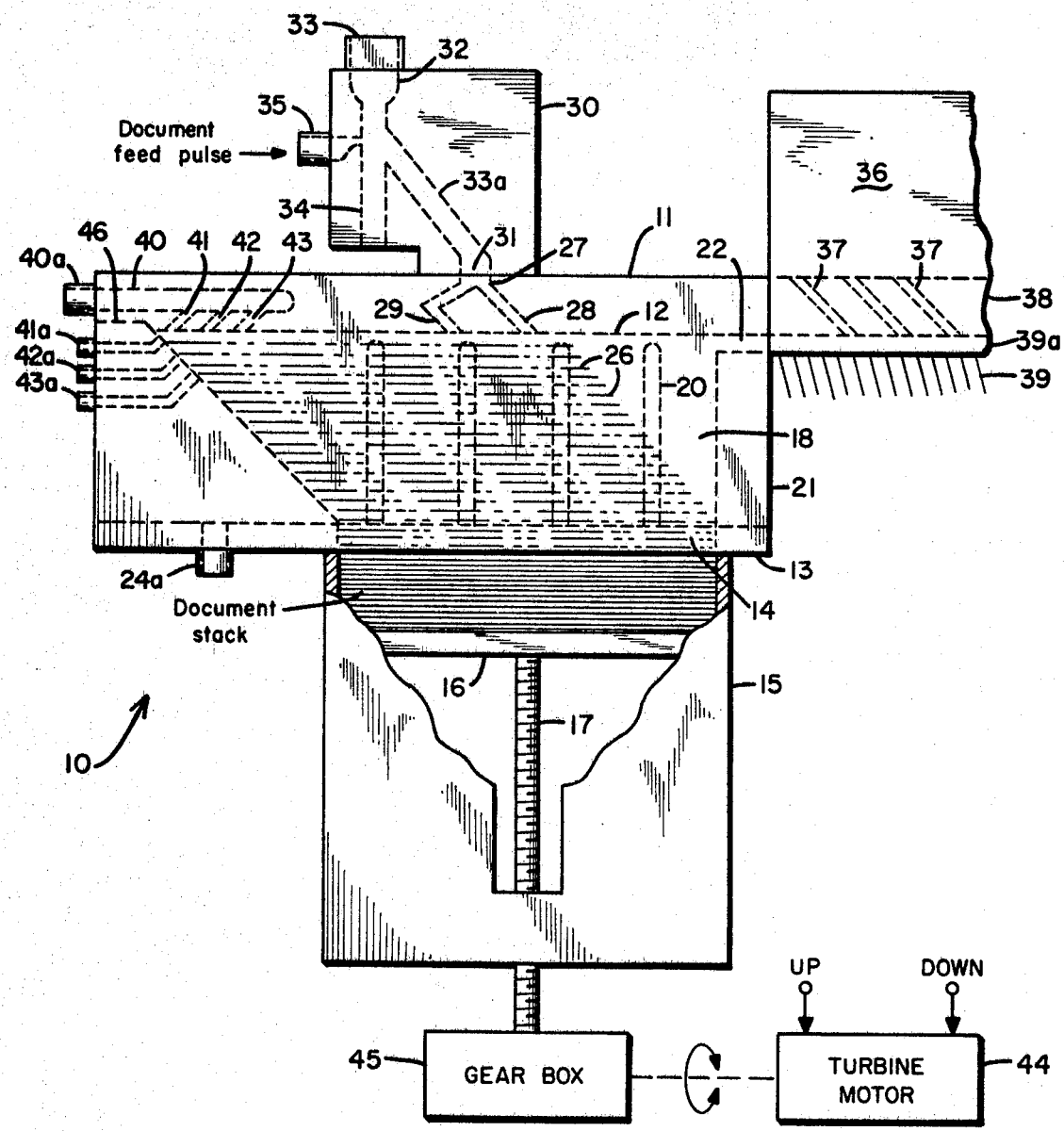
FIG. 1 is a side elevational view of one embodiment of my invention.

Reference is now made jointly to FIGS. 1 and 2 of the drawings. As shown in the drawings the feeder mechanism of the present invention comprises a document separator chamber generally indicated at 10. The document separator chamber generally indicated at 10. The document separator chamber which is a box-like structure may be made of clear plastic material and includes a top plate 11 the bottom surface of which is shown by the dashed line 12 and a bottom plate member 13. The bottom plate is apertured as indicated at 14 so as to receive a document hopper or magazine 15. The hopper or magazine 15 which may be detachably secured to chamber 10 by means not shown includes a platform 16 on which a stack of documents may be loaded and raised into the separator chamber 10 by means of a lead screw 17. The separator chamber further includes a pair of side plates 18 and 19 one of which, 18, is visible in FIG. 1. Each of the side plates 18 and 19 includes a plurality of vertical elongated slots 20 formed therein and spaced along the length of the side plates. Each of the slots 20 may if desired extend from the bottom plate 13 to the underside of the top plate 11. These slots operate as hereinafter described to admit air into the separator chamber for the purpose of separating the documents. The separator chamber further includes an end plate 21 which terminates short of the underside of the top plate 11 in order to form a throat 22 through which documents may be fed from the separator chamber 10 into a document transport system. The other or rear end of the document separator chamber may be partially enclosed with a sloping wall portion or as shown in the figures by the use of a pair of wedge-shaped blocks 22a and 23. These wedge-shaped blocks may be as indicated in the drawings symmetrically spaced transversely of the document chamber and provide a sloping surface for the rear wall of the separator chamber. Enclosing the side walls 18 and 19 are a pair of air plenum chambers shown in FIG. 2 at 24 and 25 each of which has an air fitting 24a and 25a to which a source of air pressure may be coupled. The purpose of the air plenum chambers 24 and 25 is to supply air under pressure to the slots 20 formed in the side walls 18 and 19. The slots 20 cause the air entering the chamber from the plenums 24 and 25 to play on the edges of the documents causing them to separate as indicated at 26 while the large almost unrestricted vent around the wedges 22 and 23 causes the air in the chamber to escape through the back wall section of the chamber. This flow of air escaping from the chamber drives the documents back toward the sloping faces of the wedges 22a and 23. As the documents 26 are forced up against the sloping edges of the wedges 22a and 23 a further separating force is applied to the documents. For example, if for some reason a pair of documents are stuck together, one of the documents will abut up against the wedges 22a and 23 first and will then shear off from the other document. Since the air entering the slots 20 and escaping out the back of the chamber causes the documents to firmly abut up against the wedges 22a and 23, the latter elements may be recessed into the top plate as shown at 46 to prevent the uppermost documents in the stack from being stuck in the top of the wedges.

For the purpose of feeding documents from the separator chamber, there is formed in the top plate 11 a flow divider channel 27 from which a pair of jet ports 28 and 29 depend. The jet ports 28 and 29 may typically be at an angle of 30° relative to the horizontal and may be symmetrically or centrally located in the transverse direction in the top plate 11. The flow divider channel 27 communicates with the upper surface of the top plate 11 through a port 31 which receives the direct output from a conventional fluid inverter 30 as will be described.

The inverter 30 comprises a power source input duct 32 to which an air fitting 33 is coupled for receiving air under pressure. The inverter 30 further includes a direct-output channel 33a which is shown in dotted form; an inverting channel 34 which vents to the atmosphere, and a control nozzle 35. In operation, air supplied to the fitting 33 normally escapes from the inverter 30 through the inverting channel 34 until such time as a control fluid pulse is applied to the control nozzle 35. At this time the jet formed by the inverter power duct 32 is deflected to the direct output channel 33a and through port 31 into the divider channel 27 to energize the ports 28 and 29. The control pulse applied to duct 35 is of a fixed duration and is obtained from a control system not shown. This pulse energizes ducts 28 and 29 which in turn applies a propelling force to the topmost document contained in the separator chamber driving that document into the throat 22 and thence into the document transport system. The control pulse should have a duration long enough to get the top document into the transport system but should terminate before the trailing edge of the top document has moved to the jet port 29. In this way only the top document will be moved by the feeder jets 28 and 29. Also since the documents are surrounded by air, the air film between the documents acts like an air bearing and permits the documents to be fed into the throat 22 quickly and without damage.

The transport system, which is not part of this invention, is fragmentarily shown in FIG. 1 and typically includes an air plenum chamber 36 to which air is applied under pressure by means not shown. The plenum 36 includes a bottom plate member 38 in which a series of angled ports 37 are located. A base plate indicated at 39 is spaced from the bottom plate 38 of the chamber 36 and forms with bottom plate 38 a document guide channel 39a for the transport system. The plenum 36 continuously energizes the ports 37 so that documents driven into the throat 22 by the action of the inverter 30 and the feed jets 28 and 29 are quickly driven by the jets 37 down the transport guide channel.

As hereinabove indicated the feeder mechanism of the present invention further comprises a document level sensing mechanism. As shown in the FIGS. 1 and 2 this sensing mechanism comprises a channel 40 drilled or otherwise formed in the rear of the top plate directly over the wedge 23. The channel 40 is equipped with an air fitting 40a to which a source of air pressure may be connected and three fluid jet ports 41, 42 and 43 each of which is angled downwardly to the underside of the top plate 11 so as to provide three jets of air substending across the back of the separator chamber. Positioned in the wedge 23 are three receiver channels 41a, 42a and 43a each of which is arranged to receive the jet issuing from the corresponding port 41, 42 and 43. The receiver channels 41a, 42a and 43a provide the control signals for the control circuit shown in FIG. 3 which in turn controls the operation of a turbine motor 44 for operating the lead screw 17 up and down through a gear box 45 as will now be described.

The lowest receiver channel 43a is connected via a flexible hose, for example, to one control input of a standard fluidic flip-flop 50 which has a power input duct 51 and a pair of output channels 52 and 53. The second receiver channel 42a is coupled to the control input of a fluidic inverter 54 which has a power input channel 55, a direct output 56 and an inverted output 57. The inverted output 57 is coupled to the other control input of the flip-flop 50. The output channel 52 of the flip-flop 50 is connected to the control input of a second inverter 58 the direct output of which is coupled to the "up" control channel of the turbine motor 44. The third receiver channel 41a is connected to the control input of a third inverter 59, the inverted output 60 of which is connected to the "down" input channel of the turbine motor 44.

In operation assume that the document level within the chamber is below the lowest receiver duct 43a. In this case each of the jets 41, 42 and 43 produces a high pressure signal in each of the reeciver channels 41a, 42a and 43a. The high pressure signal in the uppermost receiver channel 41a deflects the power jet of the inverter 59 to the inverted output of inverter 59 and thus applies a low pressure level to the "down" terminal of the turbine motor 44. At the same time the high level signal in the receiver channel 42a produces a low pressure level output from the inverted output duct 57 of inverter 54 while the high pressure signal present in receiver channel 43a applies a high pressure control signal to the flip-flop 50 and sets the flip-flop 50 power jet output to channel 52. The high pressure signal developed in channel 52 of the flip-flop 50 deflects the power jet in inverter 58 to the "up" terminal of the turbine motor thus causing the motor 44 operating through the gear box 45 to raise the platform 16 and thereby raise the document level in the separator chamber. When the document level has been raised to the point where the documents interrupt the flow of air to receiver channel 43a the pressure in channel 43a drops but since the flip-flop 50 remains in its set condition with the output channel 52 developing a high pressure signal the motor continues to raise the level of the documents in the separator channel. Finally, when the document level rises to the point where the second receiver channel 42a is blocked, the pressure in this receiver channel drops causing the inverter 54 to deliver a high pressure signal to the reset flip-flop 50 through the output duct 57 of the inverter 54. When the flip-flop 50 has been reset a low pressure signal is developed in the output 52 thereby causing the power output from inverter 58 to return to its inverted output channel and thus to lower the pressure on the "up" terminal of the motor 44. This will stop the motor and the motor will remain stopped until the level of the documents again drops below the lowermost receiver channel 43a, when the cycle is repeated.

If for some reason in the servo action of motor 44 the document level should rise above the second receiver channel 42a to a point where the third channel 41a is blocked, the motor 44 will reverse its motion and lower the document level in the chamber to a point where the level is maintained between receiver channels 41a and 42a. This action occurs as follows: If the document level exceeds reciver channel 42a and blocks receiver channel 41a then the pressure in channel 41a drops and the power output from inverter 59 switches to its inverted output 60 to thus apply a "down" signal to the motor 44 thereby causing the motor 44 to reverse its action and lower the document level. Then when the document level has been lowered to the point where receiver duct 41a again receives the high pressure signal from jet 41, the inverter 59 will be again switched to its direct output thereby removing the power from the turbine motor 44 causing the motor to stop. Thus it will be seen that the action of the control circuit and the document level sensors is such as to maintain the document level between the points just below channel 41a and above channel 43a. In practice the spacing between each of the channels 41a, 42a and 43a may be .1 inch.

Although I have described but a single specific embodiment of my invention it will be apparent to those skilled in the art that other embodiments thereof are possible without departing from the spirit of the invention.

The embodiments of the invention in which an exclusive property or privilege is claimed are defined as follows:

1. A document feeder mechanism comprising a document separator chamber for containing a plurality of documents to be separated, said chamber having a throat portion at one end thereof through which separated documents may be fed one at a time and an enlarged vent area in the opposite end thereof, said opposite end also having sloping wall portions against which the documents can abut, means for forcing air under pressure into the sides of said chamber and out the vent area in said opposite end whereby the air forced into said chamber operates to riffle said documents and at the same time causes said documents to firmly abut against said sloping walls thereby to separate said documents from one another, and means for moving one document at a time into said throat area.

2. A document feeder mechanism as set forth in claim 1 wherein the sloping wall portions comprise a pair of wedge shaped members.

3. A document feeder as set forth in claim 1 wherein said chamber has a top and a bottom and documents are loaded into said chamber from the bottom and wherein there is included a fluid jet means located in the top of said chamber adapted to direct a fluid stream angularly downward toward the said opposite end of the chamber so as to intersect the said opposite end of the chamber at a point intermediate the top and the bottom thereof and whereby documents above said point will intercept said jet, and means located at said point responsive to the presence or absence of the jet at said point for controlling the level of the documents in said chamber.

4. A document feeder mechanism as set forth in claim 1 wherein the last-named means includes a selectively operable fluid jet means angled into said chamber toward the throat portion thereof for propelling one document at a time into said throat portion of said chamber.

5. A document feeder mechanism as set forth in claim 4 wherein there is included a further fluid jet means including port means for issuing a jet of air and a spaced receiver means for collecting the air issued by said jet port, said jet port means and receiver means being positioned so that when the document level in said chamber is above a predetermined level the documents in said chamber will interrupt the jet to produce a first control signal in said receiver when the documents are above said level and a second control signal when said documents are below said predetermined level.

6. A document feeder as set forth in claim 5 wherein there is included a control mechanism for feeding documents into said chamber in dependence upon said first and second control signals.

7. A document feeder as set forth in claim 6 wherein said chamber includes a top plate and said jet port means comprises a plurality of ports located in the top plate of said chamber each angled vertically downwardly toward the said opposite end of the chamber and said receiver means comprises a plurality of receiver ducts spaced vertically from one another along the said opposite end of the said chamber.

References Cited

UNITED STATES PATENTS

| 2,953,371 | 9/1960 | Smith | 271—26 |
| 3,411,770 | 11/1968 | Albright | 271—26 |

FOREIGN PATENTS

| 1,448,635 | 9/1965 | France. |

OTHER REFERENCES

IBM Tech. Disclosure Bulletin, vol. 6, No. 2, 1963.

EDWARD A. SROKA, Primary Examiner